US012696851B2

(12) United States Patent     (10) Patent No.:   US 12,696,851 B2

Dimmic et al.     (45) Date of Patent:     Aug. 4, 2026

(54) SYSTEMS AND METHODS FOR RENDERING DISEASE DATA FOR AGRICULTURAL FIELDS THROUGH IMPROVED INTERFACES

(71) Applicant: CLIMATE LLC, Saint Louis, MO (US)

(72) Inventors: Matt Dimmic, Wildwood, MO (US); Thomas Eickhoff, Dardenne Prairie, MO (US); Laura Hess, Albany, CA (US); Hunter Merrill, Saint Charles, MO (US)

(73) Assignee: MONSANTO COMPANY, Saint Louis, MO (US)

( * ) Notice: Subject to any disclaimer, the term of this patent is extended or adjusted under 35 U.S.C. 154(b) by 18 days.

(21) Appl. No.: 18/671,841

(22) Filed: May 22, 2024

(65) Prior Publication Data

US 2024/0389518 A1     Nov. 28, 2024

Related U.S. Application Data

(60) Provisional application No. 63/468,496, filed on May 23, 2023.

(51) Int. Cl.
*A01G 7/06*     (2006.01)
*G06F 3/0481*     (2022.01)

(52) U.S. Cl.
CPC ............ *A01G 7/06* (2013.01); *G06F 3/0481* (2013.01)

(58) Field of Classification Search
CPC ........................................................ A01G 7/06
See application file for complete search history.

(56) References Cited

U.S. PATENT DOCUMENTS

| | | | |
|---|---|---|---|
| 2019/0174739 A1 | 6/2019 | Peters et al. | |
| 2021/0350295 A1 | 11/2021 | Singh et al. | |
| 2022/0036263 A1 | 2/2022 | Carroll | |
| 2022/0196564 A1* | 6/2022 | Wolf .................. | G01N 15/0227 |
| 2024/0393310 A1* | 11/2024 | Ampatzidis ........... | G16B 40/10 |
| 2025/0104230 A1* | 3/2025 | Shankar ................. | G06V 20/17 |
| 2025/0176473 A1* | 6/2025 | Henderson ............. | A01G 23/00 |

* cited by examiner

*Primary Examiner* — William L Gmoser
(74) *Attorney, Agent, or Firm* — Harness, Dickey & Pierce, P.L.C.

(57) ABSTRACT

Systems and methods are provided for directing crop disease treatments to agricultural fields. An example computer-implemented method includes receiving a user input from a user at a communication device associated with an interface indicative of likelihood of a first disease in a plurality of agricultural fields and, in response, determining a likelihood of occurrence of the first disease for ones of the plurality of agricultural fields. The method then also includes generating an interface indicative of the likelihood of occurrence of the first disease in the ones of the plurality of agricultural fields and causing the interface to be displayed at the communication device associated with the user.

20 Claims, 8 Drawing Sheets

300

204

202

Probability of visible symptoms 1.0    0.8    0.6    0.4    0.2    0.0

Field 615    Field 598    Field 585

Field 1108    Field 982    Field 864

Field 1441    Field 1269    Field 1187

Field 1636    Field 1631    Field 1491

Field 1840    Field 1788    Field 1665

Probability of visible symptoms 1.0

0.8

0.6

0.4

0.2

0.0

202

212

300

302 - Receive request to view interface

304 - Access data for a plurality of agricultural fields

306 - Determine likelihood of occurrence of disease(s)

308 - Generate an interface indicative of likelihoods of occurrence of the disease 312 - Receive new disease observation data 310 - Cause the interface to be displayed to the user

SYSTEMS AND METHODS FOR RENDERING DISEASE DATA FOR AGRICULTURAL FIELDS THROUGH IMPROVED INTERFACES

CROSS-REFERENCE TO RELATED APPLICATION

This application claims the benefit of, and priority to, U.S. Provisional Application No. 63/468,496, filed on May 23, 2023. The entire disclosure of the above-referenced application is incorporated herein by reference.

FIELD

The present disclosure generally relates to systems and methods for providing improved interfaces for rendering disease data for agricultural fields, generally, in real time.

BACKGROUND

This section provides background information related to the present disclosure which is not necessarily prior art.

In agricultural fields, crops are planted, grown and harvested. The performance of the crops in the agricultural fields is often measured in terms of yield. The performance of the crop may be based on a number of factors, including, for example, soil properties, weather, etc. In addition, management practices, such as treatments (e.g., pesticides, fertilizers, etc.), irrigation, etc., is also known to impact the performance of the crops in the agricultural fields.

SUMMARY

This section provides a general summary of the disclosure and is not a comprehensive disclosure of its full scope or all of its features.

Example embodiments of the present disclosure generally relate to computer-implemented methods for use in rendering interface(s) indicative of likelihood of occurrence and/or severity of disease(s) in an agricultural field, based on disease observation data and, in connection therewith, to directing crop disease treatments to the agricultural field. In one example embodiment, such a method generally includes: receiving, by a computing device, a user input from a user at a communication device associated with an interface indicative of likelihood of a first disease in a plurality of agricultural fields; accessing, by the computing device, data associated with the agricultural fields and a disease model, the data associated with the agricultural fields including disease observation data indicative of an observation of the first disease in a first field of the agricultural fields, the disease observation data including a temporal indicator, an identifier of the first disease, and an identifier of the first field; determining, by the computing device, the likelihood of occurrence of the first disease for ones of the plurality of agricultural fields, based on: (i) a model value based on the disease model; and (ii) a tuning value, using a spatially misaligned regression; wherein the tuning value is based on at least: a distance between a location of the first field and locations of the ones of the plurality of agricultural fields; generating, by the computing device, an interface indicative of the likelihood of occurrence of the first disease in the ones of the plurality of agricultural fields; and causing the interface to be displayed at the communication device associated with the user.

Example embodiments of the present disclosure also generally relate to systems for use in rendering interface(s) indicative of likelihood of occurrence of disease(s) in an agricultural field, based on disease observation data, and to directing crop disease treatments to agricultural fields. In one example embodiment, such a system comprises at least one computing device configured to: receive a user input from a user at a communication device associated with an interface indicative of likelihood of a first disease in a plurality of agricultural fields; access data associated with the agricultural fields and a disease model, the data associated with the agricultural fields including disease observation data indicative of an observation of the first disease in a first field of the agricultural fields, the disease observation data including a temporal indicator, an identifier of the first disease, and an identifier of the first field; determine the likelihood of occurrence of the first disease for ones of the plurality of agricultural fields, based on: (i) a model value based on the disease model; and (ii) a tuning value, using a spatially misaligned regression; wherein the tuning value is based on at least: a distance between a location of the first field and locations of the ones of the plurality of agricultural fields; generate an interface indicative of the likelihood of occurrence of the first disease in the ones of the plurality of agricultural fields; and cause the interface to be displayed at the communication device associated with the user.

Example embodiments of the present disclosure also generally relate to non-transitory computer readable storage media including computer-executable instructions for use in rendering interface(s) indicative of likelihood of occurrence and/or severity of disease(s) in an agricultural field, based on disease observation data, which when executed by at least one processor, cause the at least one processor to perform one or more of the above operations.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
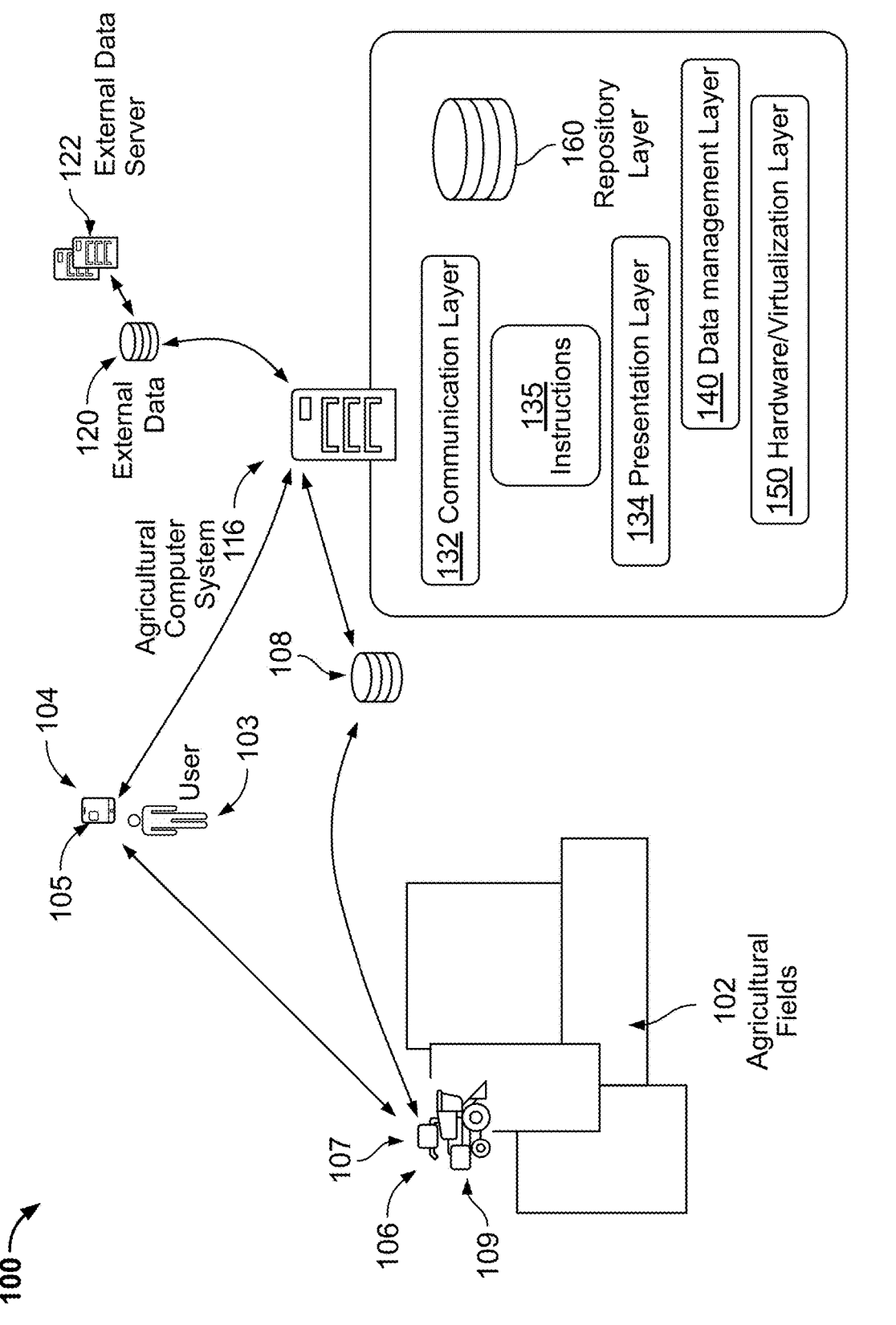
FIG. 1 illustrates an example system of the present disclosure for use in rendering interface(s) indicative of likelihood of occurrence of disease(s) in agricultural fields, based on disease observation data.
Figure 3:
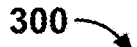
FIG. 3 illustrates an example method that may be used and/or implemented in the system of FIG. 1, for rendering interface(s) indicative of likelihood of occurrence and/or severity of disease(s) in agricultural fields, based on disease observation data.
Figure 3:
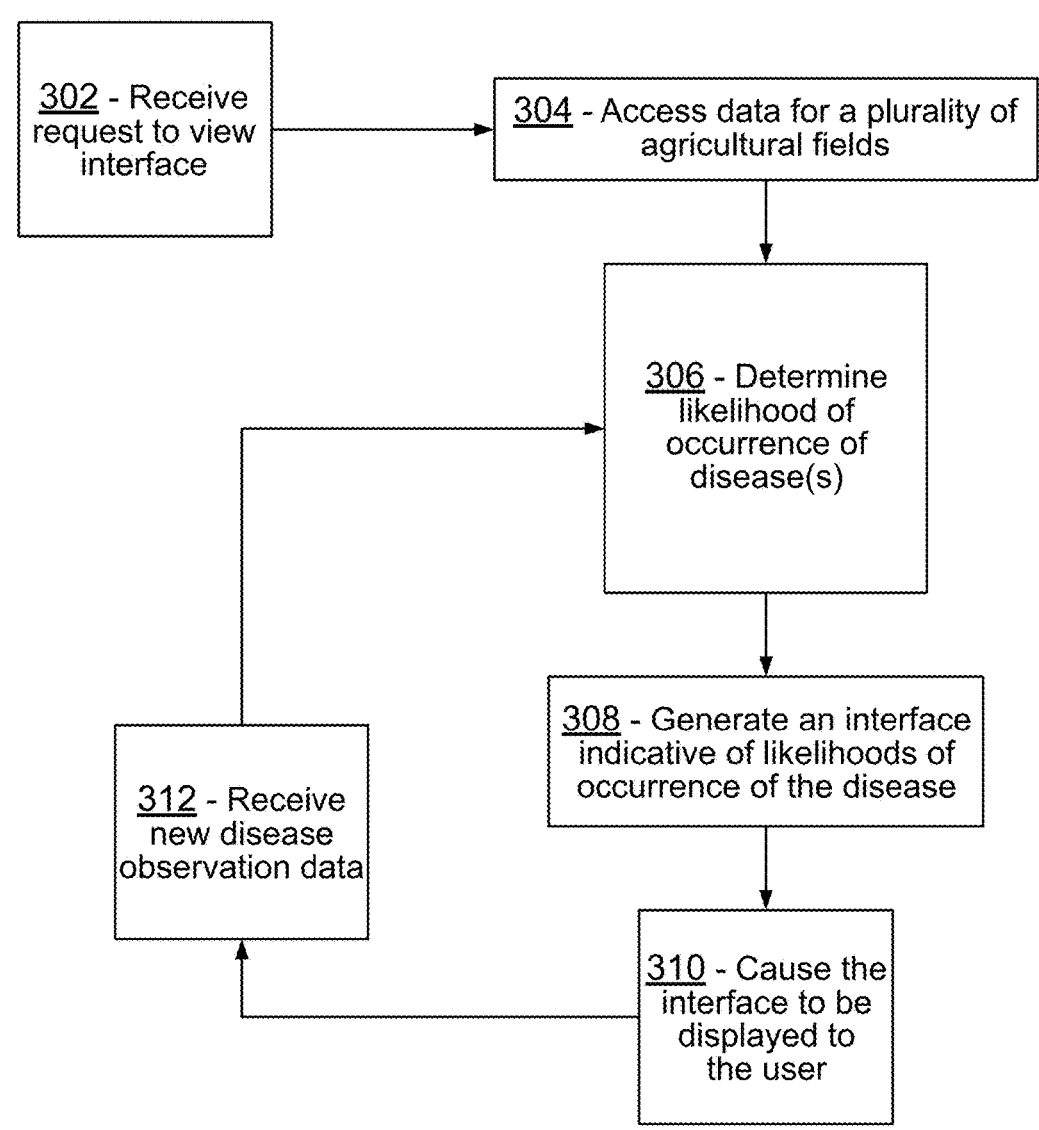
Figure 4A:
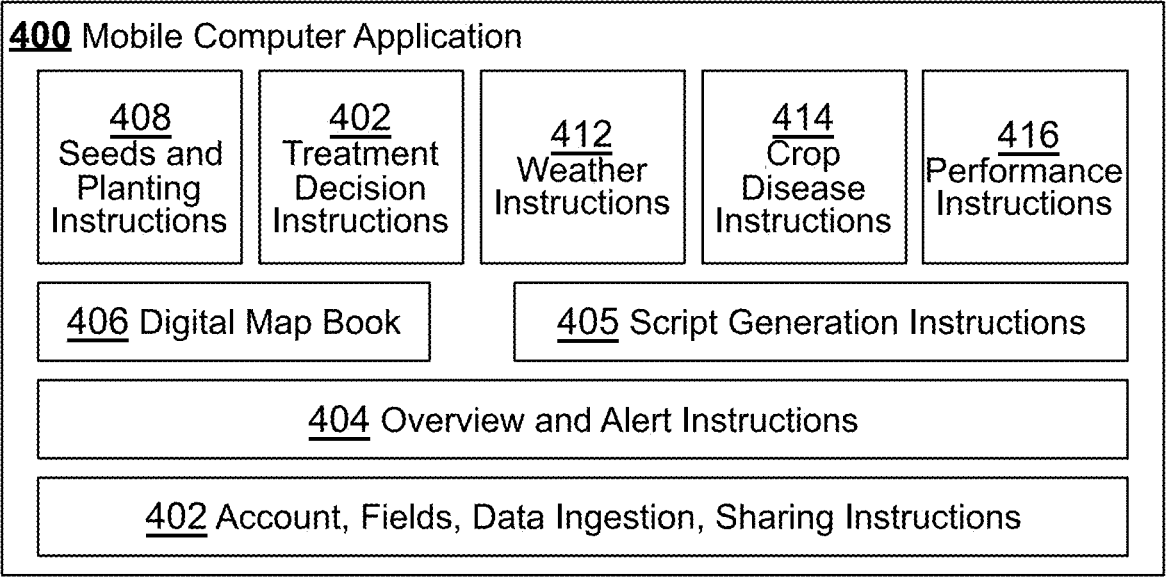
Figure 4B:
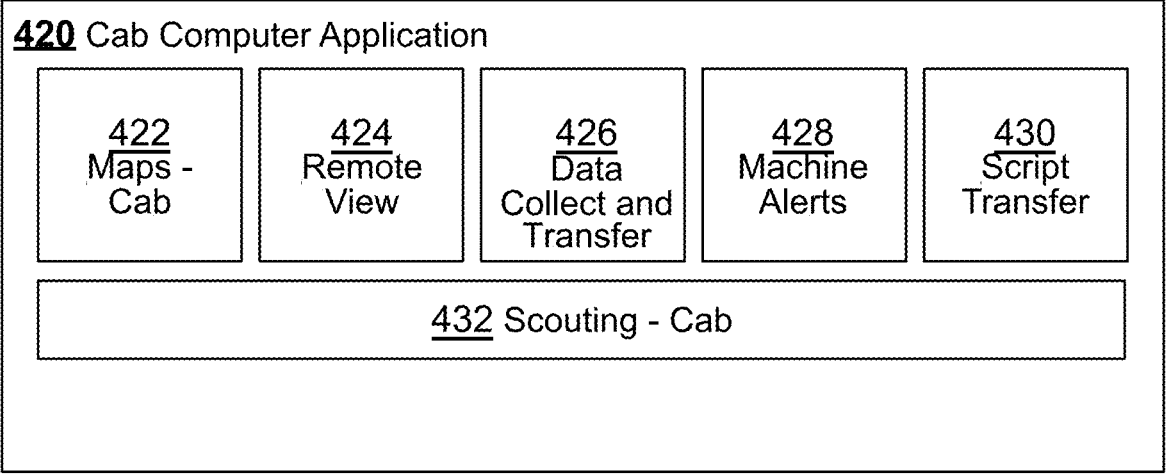
Figure 5:
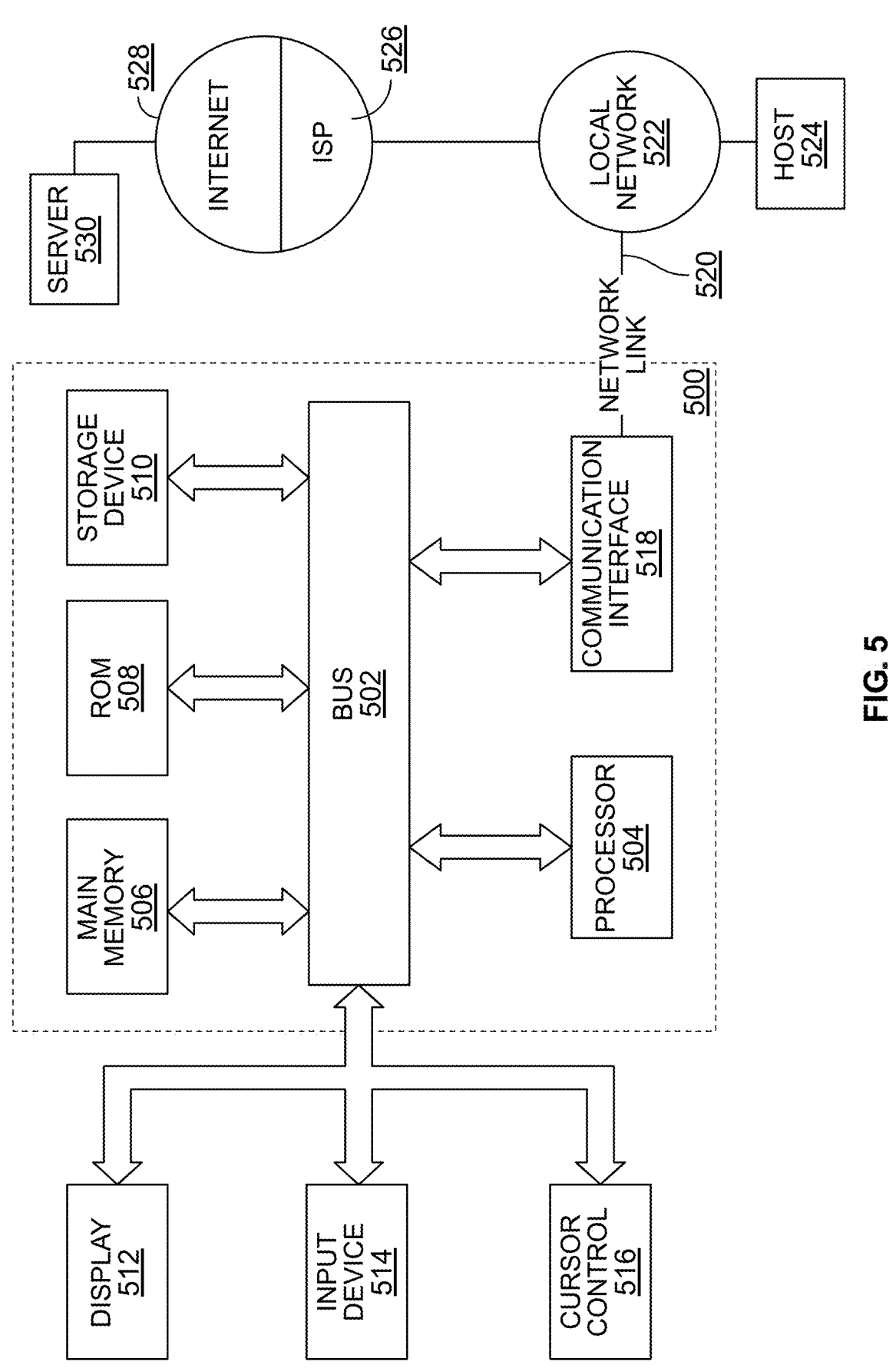

FIGS. 4A and 4B illustrate an example logical organization of sets of instructions in main memory of a computing device, (or computer system) when an example application is loaded on the computing device for execution, which may be used in connection with the system of FIG. 1 and/or the method of FIG. 3; and FIG. 5 is a block diagram that illustrates an example computing device (or computer system) upon which embodiments of the system of FIG. 1 and/or the method of FIG. 3 may be implemented.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Growers make decisions related to the planting, treating, and/or harvesting of crops in agricultural fields, based on available data, prior experience, etc., often with the aim of enhancing the performance of the crops. One example decision relates to application, or non-application, of one or more treatments to agricultural fields, to prevent or treat one or more potential crop diseases. In general, given the resources expended by the treatment, a grower is likely to decide to apply the treatment based on an expected impact on the performance of the treated crop (versus untreated crop). The expected impact is difficult to understand in the absence of accurate and up-to-date data about occurrences and/or severities of disease, which may be pertinent to specific agricultural fields, and also neighboring agricultural fields. The lack of accurate and up-to-date data causes poor decisions in treatments, which, generally, lead to underuse and associated damaged crops or overuse and the associated unnecessary resource expenditure, etc. One technique used to rely on available data includes modeling of the disease(s), whereby the model is trained based on available data, and then used to predict the disease(s). Because model training (and validation) is time consuming, additional observations may occur, which are pertinent to the likelihood of occurrence and/or severity of the disease(s) but are not relied on in training (or validating) the model. The lack of consideration of this up-to-date data leads in inaccuracies in the disease prediction, which may result, again, in underuse or overuse of treatments.

Uniquely, the systems and methods herein provide for leveraging observation data immediately to render interface (s) indicative of likelihood of occurrence and/or severity of disease(s) in agricultural fields, whereby up-to-date data is used (e.g., in real time, etc.), in combination with modeling, to predict disease(s).

In particular, after training one or more disease models related to one or more diseases, additional disease observations may be reported. The new disease observation(s) is/are compiled into a tuning value, which augments the model value to provide up-to-date prediction of disease for one or more agricultural fields. The up-to-date prediction is rendered, per field or otherwise, to provide a grower, for example, a direct view of the impact of the disease observation(s) on the likelihood of occurrence and/or severity of the one or more diseases. In this manner, full use of the available data in the form of one of one or more interfaces is provided to enhance accuracy of likelihoods of occurrence of the one or more diseases, while also extending the life-cycle of the trained disease models.

FIG. 1 illustrates an example system 100 in which one or more aspect(s) of the present disclosure may be implemented. Although the system 100 is presented in one arrangement, other embodiments may include the parts of the system 100 (or other parts) arranged otherwise depending on, for example, types of crops, types of crop diseases present in growing spaces; types and/or locations of agricultural fields; and/or privacy and/or data requirements; etc.

The system 100 generally includes a plurality of agricultural fields 102, which may be of any suitable size, acreage, etc. The agricultural fields 102 should be understood to include plots, sub-fields, greenhouses, etc. (broadly, growing spaces), wherein each of the agricultural fields 102 is a physical location, in which crops are planted, grown and harvested, etc. The agricultural fields 102 are defined by boundaries, which are, in turn, defined by growers, location, analysis, or other suitable techniques. The agricultural fields 102 may also be organized into regions, or otherwise. For example, the agricultural fields 102 may be organized by the owner and/or grower thereof.

The agricultural fields 102, then, are associated with data indicative of the crops in the fields (or to be planted in the fields), and also the conditions of the agricultural fields 102, such as, for example, soil data, weather data, etc. In connection therewith, the data is gathered at or from the agricultural fields 102. The data may be gathered manually, or automatically, for example, by farm equipment, sensors associated with the farm equipment or apart therefrom (e.g., located in the fields 102, traversing the fields 102, etc.), etc. The data may include plant/seed identifiers, plant/seed types, crop disease identifiers and/or types, crop disease observations (e.g., existence, severity, etc.), observation dates, planting dates, growing temperature days, location data, field identifiers, soil conditions (e.g., moisture, drainage, etc.), plant performance (e.g., height, strength, yield, etc.) (e.g., at one or more regular or irregular interval(s), etc.), plant growth stages, treatments, weather conditions (e.g., precipitation, temperature, humidity, etc.), field topology (e.g., elevation, change in slope, surrounding terrain, etc.), management practices (e.g., crop rotation, fungicide application, tiling, etc.), and other suitable data to identify the seed/plant, a performance of the seed/plant, crop diseases associated with the seed/plant, etc., in the agricultural fields 102.

In addition, the data includes crop disease data. Crop disease may be identified via visual inspection, qPCR testing, a specified test protocol, and/or any other suitable techniques for determining whether a disease is present or not, in the crop in the agricultural field 102. When disease is identified, disease observation data is compiled to indicate a presence (e.g., 1 for disease present, 0 for disease not present; etc.) or a severity of the disease on a scale, such as an integer scale from 0 to 9, a ranking of level 1, level 2, a percentage from 0 to 100% of the leaf area with visible symptoms, etc. The crop disease observations data may also include an identification of the agricultural field (e.g., Field 1234, etc.), the type of crop, the type of disease (e.g., corn grey leaf spot, soybean frogeye leaf spot, corn northern leaf blight, corn southern rust, soybean white mold, etc.), and potentially, severity, etc. The crop disease observation data may also include a location of the observation (such as a latitude and longitude of the agricultural field 102), etc. That said, other suitable data may be included for specific crops, diseases, etc., as desired or required.

The data for the agricultural fields 102 may be gathered over a single year, or multiple years. As such, the data may be indicative of the agricultural fields 102 for one year, fives years, ten years, or twenty years, and may include all, or at least a portion of the data above for each of the years.

With continued reference to FIG. 1, the system 100 also includes farm equipment 106 (e.g., agricultural machines, etc.), a data server 108 (or multiple data servers), and an agricultural computer system 116, each of which is coupled to (and is in communication with) one or more network(s). The network(s) is/are indicated generally by arrowed lines in FIG. 1, and may each include, without limitation, one or more of a local area network (LAN), a wide area network (WAN) (e.g., the Internet, etc.), a mobile/cellular network, a virtual network, and/or another suitable public and/or private network capable of supporting communication among parts of the system 100 illustrated in FIG. 1, or any combination thereof.

It should be appreciated that while illustrated separately, the data server 108 and the agricultural computer system 116 may be integrated together, in whole or in part. In general, however, in this example embodiment, the data described above is stored in the data server 108.

Further, in this example embodiment, the farm equipment 106 may include, without limitation, one or more harvesting devices, sprayers, planters, etc. In particular in the illustrated system 100, as shown in FIG. 1, the farm equipment 106 may include one or more of a combine, a picker, or other mechanism for harvesting plants/crops, etc. Additionally, or alternatively, the farm equipment 106 may include other land-based or air-based equipment, such as, for example, unmanned aerial vehicles (UAVs), manned aerial vehicles (MAVs), tillers, irrigators, or other suitable equipment, configured to carry out one or more operations at the agricultural fields 102, such as, for example, surveying, image capture, tilling, application of treatments, watering, etc.

It should also be appreciated that a different number and/or type of farm equipment may be included in other system embodiments. For instance, the system 100 may include multiple of the same or different farm equipment for performing desired task at the fields 102.

The farm equipment 106 is configured to measure, capture, or identify data, and additionally to compile data, which are specific to the crop and/or agricultural fields 102 as the equipment is performing one or more defined tasks related to the crop or agricultural fields 102, etc. The data may include, without limitation, rates, soil compositions, times, dates, yield, weights, applications, moisture content, volumes, flow, or other suitable data, etc., relating to treatments, irrigation, harvested crops, etc. Moreover, in this example, the farm equipment 106 may be configured to track their locations at given times, as each traverses the agricultural fields 102, as expressed in latitude/longitude coordinates, or otherwise, and to correlate the locations to other data gathered/compiled by the farm equipment 106 (e.g., permitting the data to be correlated to a specific plant and/or seed based on planting data for the growing spaces, etc.).

The farm equipment 106 is further configured to transmit the compiled data to the data server, either directly or via the agricultural computer system 116, which stores the data therein (and/or in the data server 108). That said, a different number of data servers may be included in other system embodiments, with the different data servers each potentially being specific to certain ones (or more) of the agricultural fields 102 or regions, or farm equipment, etc.

In the example embodiment, the system 100 further includes a user 103, who generally includes a grower, operator, or worker associated with one or more of the agricultural fields 102. The user 103 is associated with and/or responsible for making and/or implementing decisions related to the agricultural fields 102, for example, for planting, treatments, irrigation, harvesting, etc.

It should be understood that the user 103 may include one person, or multiple people, where each is associated with one or more specific tasks related to the agricultural fields 102.

As shown in FIG. 1, the user 103 is associated with a communication device 104 (e.g., as a field manager computing device, etc.), which is generally a computing device (e.g., mobile device, etc.), which may be configured to provide access to the user 103 to various agricultural data. In particular, in this example embodiment, the communication device 104 is configured by an application 105, to provide access to the data, or to permit the user 103 to enter, modify, delete, etc. data. The application 105 is a mobile application, which may include, for example, the CLIMATE FIELDVIEW application and/or associated tools, commercially available from Climate LLC, Saint Louis, Missouri. The application 105 may further include a browser in cooperation with the CLIMATE FIELDVIEW application and/or associated tools. The communication device 104 is configured, by the application 105, to access data from, and, potentially, to receive data from and/or provide data to different devices in FIG. 1, via the one or more networks (as indicated by the arrowed lines). Data input by the user 103 may include, for example, without limitations, planting data (e.g., seed type, seed rate, etc.), treatment data (e.g., fungicide application, etc.), field boundary indicators, disease observation data, or other relevant data observed or known by the user 103, etc.

The communication device 104 associated with the user 103 may be further configured to transmit the gathered data, directly or via the agricultural computer system 116, to the data server 108, which stores the data therein.

The data server 108 is configured to store the data described herein in one or more data structures. In general, in this example embodiment, the data server 108 is configured to store data by year (e.g., Year_X, Year_X+1, etc.), by grower, and/or otherwise, etc. Then, for each year or grower or grower/year, the data includes data for each of the agricultural fields 102 including, for example (and without limitation), disease observation data, performance data, identifier of crops, brands for seeds, relative maturity, planting dates, temperature days, growing mode of action, prior crops, types of traits or trait stacks, treatments, positions/distributions of seeds in the agricultural fields 102 (e.g., seeding rates, etc.), location definitions of the agricultural fields 102 or of seeds within the agricultural fields 102 (e.g., field boundaries, latitude and longitude, centroid or other boundary, etc.), acreage of the growing spaces, populations of seeds planted in the agricultural fields 102, yields and harvest grain moisture (e.g., based on location and seed products, etc.), etc. The data may also include soil conditions (e.g., soil moisture, drainage levels, etc.), field elevations (which may include slopes of a plot, surrounding terrain information, etc.), precipitation amounts, relative humidity, temperature, solar radiation, irrigation amounts, management practices (e.g., crop rotation, fungicide application, tiling, drainage, etc.) or any other data indicative of the growing conditions for the seeds/plants in the given agricultural fields 102, etc.

It should be appreciated that any available and/or desired data may be collected and/or received (or obtained) with regard to the agricultural fields 102. What's more, the data included in the data structure(s) of the data server 108 may be augmented with additional information about the crops and/or agricultural fields 102 from one or more other sources, such as, for example, external data 120 from external data server 122. The external data server 122 may include one or more additional entities, which is configured to capture and store data relevant to the agricultural fields 102. One example external data server 122 includes a weather source, while other examples include soil data sources, treatment data sheets sources, boundary data sources (e.g., boundary definitions, centroids, etc.), field topology sources, etc.

Given the above, in this example embodiment, the agricultural computer system 116 is configured to cooperate with the communication device 104 to display various interfaces to the user 103 (at the communication device 104), which may be viewed by the user 103 in order to aid the user 103 in decisions related to the agricultural fields 102.

In particular, the likelihoods of occurrence and/or severity of one or more diseases in the agricultural fields 102 is determined based on a number of different factors, which are generally reflected in the data obtained (by the farm equipment 106, the agricultural computer system 116, and the communication device 104) in/from the data server 108. In connection therewith, the agricultural computer system 116 is configured to access the data therein (and from the external data server 122) and to train a model (e.g., a disease model, etc.) to determine likelihoods of occurrence and/or severity of one or more diseases occurring in one or more of the agricultural fields 102, based on the data included in the data server 108, on or before a given training date (i.e., available data is used to train the model).

The trained model may include any suitable model, including, for example the joint disease model described in Applicant's U.S. Provisional App. No. 63/438,975, filed Jan. 13, 2023, which is incorporated herein by reference in its entirety, and which is based on a latent Gaussian process, etc. Once trained, the model may be retrained at one or more regular or irregular intervals, as additional data, as described above, becomes available from the agricultural fields 102 in the data server 108 or external server 122.

The agricultural computer system 116 is configured to store the trained model therein, and then also to generate, based on the trained model, likelihoods of occurrence and/or severity of one or more diseases, for each of the agricultural fields 102 in the system 100, or a subset thereof. In connection therewith, the communication device 104 is configured, by the application 105, to request one or more disease interfaces, from the agricultural computer system 116, whereby the agricultural computer system 116 is configured to provide the disease data in one or more forms to the communication device 104. For example, the agricultural computer system 116 may be configured to provide the disease data as structured data, for example, in a disease map interface, which includes the disease data over a regional map view of the agricultural fields 102. Upon receipt of the disease map interface (or other disease interface), the communication device 104 is configured to render the disease map interface (or other interface) for viewing by the user 103.

Figure 2A:
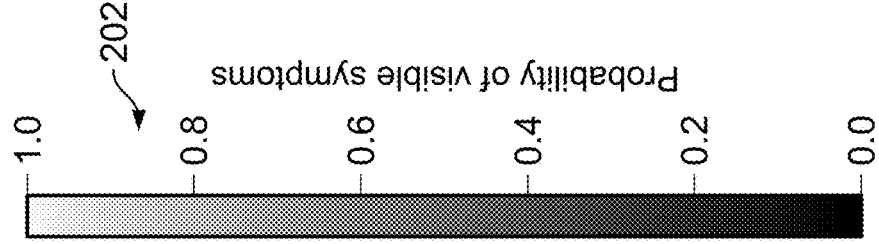
FIGS. 2A-2D illustrate various example agricultural field interfaces, which include features described herein.

FIG. 2A illustrates an example interface 200, which is displayed at the communication device 104 and which includes a disease map for the agricultural fields 102 for the northern leaf blight disease. The likelihoods of occurrence of the disease, then, are visually represented by a color located at a position in the map corresponding to ones of the agricultural fields 102. The different colors then, in this example, illustrate the different likelihoods of occurrence of the specific disease. In particular, the interface 200 includes a likelihood scale 202, which illustrates the likelihoods of occurrence of the disease in a color change from one darker color (e.g., purple, etc.) to a lighter color (e.g., yellow, etc.). It should be understood that any different colors, or transitions between the colors may be used in other interface embodiments to illustrate the likelihoods of occurrence of the disease. Moreover, colors may represent disease data other than likelihood of occurrence, such as, for example, severity from 0 to 9 (or other suitable range), disease damage from 0 to 100%, etc. More generally, it should be appreciated that other visual distinctions, such as, for example, patterns, hatching, etc., may be used to indicate the different likelihoods of occurrence of a specific disease in other interface examples. As shown in FIG. 2A, the scale 202 runs from 0.0 to 1.0, which generally, indicates no chance (0% chance) to certain (100% chance). Different scales may also be included in other embodiments to inform the user 103 about the potential for disease occurrence.

It should be appreciated that the agricultural fields 102 included in the interface 200 may include agricultural fields in a given region, agricultural fields associated with a specific grower (e.g., the user 103, etc.), agricultural fields associated with a given treatment application, and/or agricultural fields specific to a user input, etc. The agricultural fields 102 may further be filtered based on region, location, grower (or location of the user 103), or user input criteria, etc., in the interface 200, to show only ones of the desired agricultural fields 102 consistent with the filter criteria.

Figure 2B:

FIG. 2B, for example, illustrates a grower specific interface 204, which may be selected in the communication device 104. In particular, from a pulldown, checkbox, text, or other input, the user 103 may select the grower's agricultural fields, or a subset thereof, to be presented in a tile-view, and in response, the communication device 104 is configured, by the application 105, in connection with the agricultural computer system 116, to display the tile-view interface 204. In the tile-view interface 204, each agricultural field is shown separately, with boundaries, in a grid or other pattern of agricultural fields, yet with likelihoods of occurrence of one or more diseases shown in the color of each agricultural field. It should be appreciated, again, that other visual distinctions may be included to depict the chance of occurrence and/or severity of the one or more disease (e.g., different patterns, hatching, etc.). Also, as shown in FIG. 2B, the interface 204 includes labels for each of the agricultural fields (e.g., Field 585, Field 1840, etc.), so that the user 103 is able to distinguish the agricultural fields by their shape or by the labels.

As shown, the tile view interface 204 also includes the scale 202, which, like above, defines the colors as indicative of particular likelihoods of occurrence of the specific disease.

Figure 2C:

FIG. 2C illustrates an example line-graph interface 206, which may be selected in the communication device 104. In particular, from a pulldown, checkbox, text, or other input, the user 103 may select the grower's agricultural fields, or a subset thereof, to be presented in a line-graph view, and in response, the communication device 104 is configured, by the application 105, in connection with the agricultural computer system 116, to display the line-graph interface 206. In the line-graph interface 206, each agricultural field is shown separately as a line in the graph, where the line indicates the likelihood of occurrence of the color-coded disease over time. The color-codes are shown in the key in the upper left corner of the interface 206, with a first color being gray leaf spot (GLS), a second color being northern leaf blight (NLB), a third color being southern rust (SR), a fourth color being white mold (WM), and a fifth color being frogeye leaf spot (FLS). When a line is selected, the communication device 104 is configured, by the application, to display a lightbox over the interface 206, which includes details of the agricultural field (e.g., identifier, size, crop, likelihood of occurrence of the specific disease, etc.). It should be appreciated that the line-graph interface 206 may include other forms or formats of graphs, lines, objects, shapes, etc., in other interface embodiments, etc., indicating one or more of the same or other relevant diseases, etc.

That said, it should be appreciated that the interfaces 204, 206 of FIGS. 2B and 2C, respectively, generally represent alternative manners of illustrating the grower information from FIG. 2A. To this point, it should also be appreciated that such information may be shown in still other interfaces in other example embodiments.

Referring again to FIG. 2A, as noted above, the interface 200 is illustrated as being associated with the likelihood of occurrence of northern leaf blight (NLB), whereby the coloring is indicative of the specific likelihoods of occurrence (as indicated above). As shown in FIG. 2A, the user 103 may interact with a further interface 208, which is included in or overlaid on the interface 200, to provide for a selection to a pulldown for different diseases. As shown, the user 103 may also (or alternatively) select the frogeye leaf spot disease instead of norther leaf blight, whereby the communication device 104 is configured, by the application 105, in connection with the agricultural computer system 116, to modify the interface 200 to show colors indicative of the likelihoods of occurrence of frogeye leaf spot in the agricultural fields, instead of norther leaf blight. Again, the color or other visual distinction for each of the agricultural fields 102 then indicates the chances of occurrence the selected disease. It should be appreciated that the interface 208 may be used to select other diseases, such as, for example, corn grey leaf spot, corn southern rust, soybean white mold, corn tar spot, soybean brown spot, etc., or to otherwise alter the interface 200 according to a desire of the user 103. While not shown, a similar interface 208 may be included with (or overlaid on) the interface 204, 206 of FIGS. 2B and 2C, respectively, in other example embodiments.

In connection therewith, the user 103 may access the interface 200, as shown, or as modified through the interface 208 or similar interfaces, or in the other interfaces 204, 206, to understand the likelihood of occurrence and/or severity of one or more diseases on or near ones of the agricultural fields 102, for which the user 103 is to make decisions related to treatment, etc.

As explained above, the model herein is trained based on available data at a given time. Logically, additional disease observations may be generated after the training of the model. It should be appreciated that from time to time, as indicated above, the model may be retrained to account for the new disease observation data. In connection therewith, the model is trained and validated, before being accessible to the user 103, through the associated application 105. As such, even with the retraining, while the retraining is occurring or some interval associated with retraining or validation, there is potential for the model to generate likelihoods of disease occurrence, which is incomplete as to additional, subsequently generated disease observations.

In this example embodiment, the agricultural computer system 116 is configured to tune the likelihood of disease occurrence, form the model, based on one or more disease observations.

In particular, in connection with the inspection of one or more of the agricultural fields 102, the user 103 may observe the presence of a disease. Based on the observation, the user 103 submits the disease observation to the agricultural computer system 116. Specifically, with reference to FIG. 2A, the user 103 may drop a pin 210 in the interface 200, where the location of the pin is specific to one of the agricultural fields 102, in which the disease is observed. The communication device 104 is configured, by the application 105 (e.g., CLIMATE FIELDVIEW application tool referred to as Scouting Notes or from other similar entry applications, tools, or features, etc.), to display the interface 200 and to accept the pin 210 from the user 103, via a continued touch, or double click, or other input from the user 103 on the interface 200 at that location. It should be appreciated that the communication device 104 may be configured, by the application 105, to solicit additional information from the user 103 about the observed disease, such as, for example, date/time, manner of observation, type of disease, severity, etc.

It should also be appreciated that while a pin drop is used in the example in FIG. 2A, other manners of inputting the disease observation may be used. For example, the user 103 may input the field name and/or field number and disease type to a text input (or selection input), through one or more other interfaces. For example, the user 103 may double click on a specific agricultural field in interface 204 of FIG. 2B, whereby the communication device 104 is configured, by the application, to display a lightbox to solicit details of the observation and to accept the disease observation, from the user 103, based on selecting a submit button in the lightbox, for that specific agricultural field. Or, the user 103 may drop a pin in one of the specific fields in the interface 204, resulting in the same operation of the communication device 104.

Regardless of the manner of inputting the disease observation, the communication device 104 is configured, by the application, to transmit disease observation data indicating the disease observation to the agricultural computer system 116. Table 1, for example, illustrates example disease observation data that may be received from the communication device 104 or other computing device (e.g., another communication device, etc.), for one of the agricultural fields 102 (having Field ID A). As shown, in this example, the disease observation data includes a field identifier, a crop type, a disease type, a severity rating and an observation date (or temporal indicator).

TABLE 1

| Field ID | Crop | Disease | Severity rating | Observation date |
|---|---|---|---|---|
| A | corn | Grey leaf spot | 4 | [date] |

It should be appreciated that the disease observation data may include more or less data in other embodiments. For example, the crop and/or the severity of the disease may be omitted in the disease observation data, while other data may be included in other examples.

Based on the disease observation data, the agricultural computer system 116 is configured to generate a tuning value, for each of the agricultural fields (as presented by the colors per agricultural field in interface 200, for example). Specifically, new likelihoods of occurrence of disease are based on the original risk indicated by the model value ($w_i$) and also the tuning value $$(\Sigma_{i,Z}^{T} \Sigma_{Z}^{-1} Z),$$

which is provided by the following expression of a spatially misaligned regression:

$$logit[P(Y_i = 1)] = \Sigma_{i,Z}^T \Sigma_Z^{-1} Z + w_i$$

$$w \sim N(0, \Sigma(\theta))$$

In the above expression, Y is the regular training data; T is an operator for transpose; Z is a vector of data indicative of the new observation data, where the length of the matrix is based on the number of agricultural fields and the value is indicative of disease (1) (or other suitable value) or no disease (0); and $w_i$ is the value from the trained disease model (e.g., joint disease model, etc.) for agricultural field i. It should be appreciated that an existing value for $w_i$ may be retrieved from memory, where it was previously determined for the specific agricultural field, or the agricultural computer system 116 may be configured to determine the value for $w_i$ in connection with the above expression to determine the new likelihood of occurrence to, for example, account for additional model-specific data such, as for example, weather data, etc. In one example, the trained model may be executed daily to determine the value for $w_i$ and then during that day, the value for $w_i$ may be retrieved in connection with the above, thereby enabling the trained model to account for up-to-date data (e.g., weather data, etc.), while also limiting processing resource in connection with multiple determinations of the new likelihood of occurrence (e.g., only determine tuning value, etc.).

The variable $\Sigma$ is the cross-covariance matrix between Y and Z, which is expressed as provided below:

$$\Sigma_{i,j} = Cov(logit(Y)_{i,s,t}, Z_{i',s',t'}) = B[d, d'] \exp(-\|s - s'\|/\phi_1) \exp(-|t - t'|/\phi_2)$$

In this expression, covariance is determined between disease risk on agricultural field i and agricultural field j; and d and d' are the diseases of interest on field i and field j respectively (e.g., disease of interest versus disease included in observation data, etc.) multiplied by disease effect matrix B. In particular, the matrix B indicates a correlation between different diseases. For example, where the disease model is a joint disease model, which indicates the likelihood of occurrence of a given disease (e.g., see interface 206, etc.), the matrix B includes a value for how each disease impacts each other disease (e.g., the effect of NLB on grey leaf spot, etc.). The matrix B thus defines a dimension based on number of diseases considered (e.g., 5×5 for five diseases, etc.), which is indicative of impact of one disease on another (e.g., 1 for same disease, but otherwise for differing diseases, etc.).

Additionally, s-s' is the distance between agricultural field i and agricultural field j; and t-t' is the time between the observation in agricultural field i and the current time. Also, $\Phi_1$ and $\Phi_2$ are spatial and temporal decay parameters, respectively, that are learned and/or tuned during training the model. The parameters account for diminishing effect diseases have on each other as the distance between the agricultural field and the disease observation grows. For example, the parameters may indicate that NLB on field i will have a stronger effect on GLS on a nearby field j than on a very distant field k.

It should be appreciated that the above expressions may be different in other examples, or may be changed and/or altered based on the data to be considered in adjusting the likelihoods of occurrence and/or severity of the one or more diseases. For example, time differences may be omitted, or distances may be omitted for a certain set of agricultural fields (e.g., only fields within a few miles, etc.), or differences in disease may be omitted for certain diseases, or models, or distances in some directions (east-west) may be treated differently from distances in other directions (north-south), or the disease-space-time correlations may not be multiplicatively separable, etc.

Figure 2D:
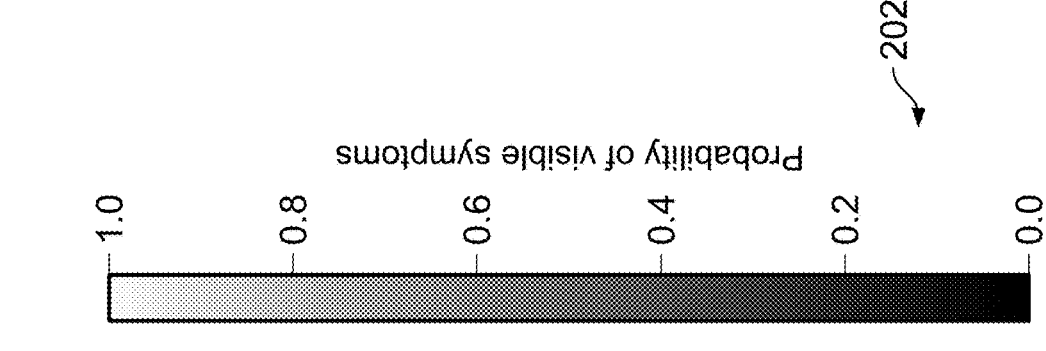
Figure 2D:
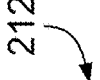

Based on the above, the agricultural computer system 116 is configured to determine the likelihoods of occurrence and/or severity of the specific disease, for each of the agricultural fields, based on the model value and the tuning value. Next, the agricultural computer system 116 is configured to generate (or regenerate or update) the interface 200 (e.g., update the interface 200, etc.) to include the likelihoods of occurrence of the specific disease, whereby the coloring thereof may change. The updates are then illustrated in interface 212 of FIG. 2D. As shown, for example, in the interface 212, the coloring indicative of the likelihoods of occurrence of the norther leaf blight disease is changed (as compared to the interface 200 in FIG. 2A) thereby taking into account the new disease observation represented by the pin 210. In this manner, in this exemplary embodiment, the agricultural computer system 116 is configured to respond to the pin 210 (i.e., determining the likelihoods of occurrence and/or severity and generating the interface) in real time or near real time to update the interface 200 to be the interface 212. In this example, real time includes within milliseconds, a few seconds, or up to ten seconds, while near real time may include from more than ten seconds, up to a minute, or up to three minutes, or up to five minutes, etc.

Based on the interface in the communication device 104 (which includes the new/updated likelihoods of occurrence and/or severity of the specific disease), the user 103 may respond in one or more different ways. For example, if the time series forecast in FIG. 2C indicates disease risk will increase on a majority of the agricultural field for which the user 103 is responsible in the near future, the user 103 may direct an application of one or more fungicides (e.g., whereby an input is provided from the grower (via the communication device 104) to the agricultural computer system 116 indicating fungicide, timing, agricultural fields (s), etc. In connection therewith, the agricultural computer system 116 may be configured to generate one or more scripts (e.g., via script generation instructions 305, etc.), in response to the input from the user 103, to effect application of the one or more fungicides in the specific agricultural fields (e.g., via equipment 106, etc.). In another example, where the user 103 sees on the tile view in FIG. 2B that many of the agricultural fields for which the grower is responsible have low risk, the grower may opt to not proceed with one or more fungicide, through understanding that the overall risk to those agricultural fields is limited. In another example, where the user 103 scouts one or more of the agricultural fields 102 and witnesses the disease, the grower may then input another observation(s) (consistent with the above) to again view the likelihood of occurrence in other surrounding fields. The user 103 may rely on the new likelihoods of occurrence to schedule the fungicide application, through the agricultural computer system 116 or otherwise, etc.

Apart from the specific response of the user 103, it should be appreciated that additional disease observation data may be entered from time to time by the user 103 or other growers/users in the region (before the model is retrained), as observed in the agricultural fields 102 or other agricultural fields in the region, with the likelihoods of occurrence of one or more diseases in the agricultural fields being determined/updated, in real time or near real time, through the tuning value accordingly as described above. That is, the agricultural computer system 116 is configured to determine the likelihoods of occurrence of the disease based on any additional observations through the tuning value above, and to display the same through various interfaces in the communication device 104, whereby the user 103 is able to further respond as explained above.

Subsequently, at some time thereafter, the agricultural computer system 116 is configured to retrain the model (e.g., which is represented by $w_i$) based on a prior training set of data for the model and also some or all of the observation data entered through the communication device 104, by the user 103, or other users to the agricultural computer system 116. After training, the model is again used as above, with new observations after the retaining again being accounted for through the tuning value.

FIG. 3 illustrates an example method 300 for rendering interface(s) indicative of likelihood of occurrence of disease (s) in agricultural fields, based on disease observation data. The example method 300 is described herein in connection with the system 100, and may be implemented, in whole or in part, in the agricultural computer system 116 of the system 100. However, it should be appreciated that the method 300, or other methods described herein, are not limited to the system 100 or the agricultural computer system 116. And, conversely, the systems, data structures, and the computing devices described herein are not limited to the example method 300.

At the outset in the method 300, the agricultural computer system 116 receives, at 302, a request from the user 103 (broadly, an input) to view one or more interfaces, which are indicative of likelihood of occurrence and/or severity of one or more disease(s) in one or more agricultural fields (e.g., one or more of the fields 102, etc.). The request may include an indication of one or more specific diseases, designation(s) of one or more agricultural fields, and/or other parameters of what the user 103 wants to be included in the one or more interfaces, etc. Further, the request may be received, by the agricultural computer system 116, from the communication device 104, through the application 105 therein (e.g., the CLIMATE FIELDVIEW application, commercially available from Climate LLC, Saint Louis, Missouri.).

In response to the request, the agricultural computer system 116 accesses, at 304, data consistent with the request (e.g., from the data server 108, etc.). The data includes relevant data for the trained model described above to generate a likelihood of occurrence and/or severity of one or more diseases in the agricultural fields 102 indicated by the request, and also any additional observation data (if any, for example, since training of the model) in the region of the agricultural fields (e.g., within the state, threshold mileage, etc.), or associated with the agricultural fields (e.g., having the same crop, by the same grower, etc.).

The agricultural computer system 116 also accesses the trained model and the algorithm described above, and associated matrices, weights, variables, etc.

At 306, the agricultural computer system 116 determines a likelihood of occurrence and/or severity of the one or more diseases for ones of the agricultural fields 102. In particular, consistent with the above, the agricultural computer system 116 determines a model value for one of the agricultural fields 102, which is based on the trained model and associated data related to the agricultural fields (e.g., weather, etc.). The agricultural computer system 116 may also determine the tuning value for that one agricultural field, for each specific disease, based on available observation data (if any). And, the agricultural computer system 116 combines the model value and the tuning value (if/when determined), for each disease and specific agricultural field, into the likelihood of occurrence and/or severity of the disease in that agricultural field. The agricultural computer system 116 repeats the above for each of the agricultural fields 102 and/or diseases consistent with the request from the user 103. That said, it should be appreciated that the agricultural computer system 116 may determine the likelihood of occurrence and/or severity of the one or more diseases for ones of the agricultural fields 102 with or without tuning (e.g., with or without the tuning value, etc.). For instance, if observation data is not available (or not yet available from the user 103 or others), the agricultural computer system 116 may determine the likelihood of occurrence and/or severity of the one or more diseases for ones of the agricultural fields 102 without tuning. Then, as observation data becomes available, the agricultural computer system 116 may determine/update the likelihood of occurrence and/or severity of the one or more diseases for ones of the agricultural fields 102 with tuning (taking into account the available observation data, etc.).

As such, the agricultural computer system 116 determines the likelihoods of occurrence and/or severity for each of the one or more diseases for each of the one or more agricultural fields 102.

The agricultural computer system 116 then generates, at 308, an interface indicative of the likelihoods of occurrence of the disease(s), which includes a map of the agricultural fields 102 with each color-coded (or otherwise visually distinguished) specific to the likelihood of occurrence of a first disease.

At 310, the agricultural computer system 116 causes the interface to be displayed at the communication device 104, generally, in response to the request for the interface. The user 103 is then able to view the map of likelihoods of occurrence of the first one of the diseases in the agricultural fields 102, and manipulate the interface to view the likelihoods of occurrence of a second one of the diseases in the agricultural fields, or view severity instead, etc.

Thereafter, the user 103 may enter one or more new disease observations, after, for example, inspecting one or more agricultural fields 102. In particular, the user 103 may select an option to enter a disease observation, whereby the user 103 is permitted to drop a pin (broadly, user input) at a specific agricultural field (or otherwise indicate the disease observation) in the interface displayed to the user 103 at the communication device 104. The user 103 may indicate the specific disease from a pulldown menu, or otherwise, and any additional data associated with the observation. For example, the user 103 may drop a pin in Field 1234 and define the pin as an observation of fusarium.

In turn, the communication device 104 communicates the new disease observation data, which includes a temporal indicator (e.g., date/time, etc.), the disease type, field identifier (or location), etc., to the agricultural computer system 116, which receives the new disease observation data, at 312. In the example above, the disease observation data includes an indication of fusarium, Field 1234, June 24, etc. It should be appreciated that the user 103 may enter more than one new disease observation, whereby disease observation data indicative of each disease observation is received by the agricultural computer system 116.

The agricultural computer system 116 returns to step 306 and determines, again, the likelihood of occurrence and/or severity of each disease in each of the agricultural fields 102, as described above (or at least updates the tuning value for each field/disease), further based on the new disease observation data received at 312. The agricultural computer system 116 then generates the interface, at 308, as an updated interface, and causes the updated interface to be displayed to the user 103, at the communication device 104, at 310.

While step 312 is described with reference to the user 103, it should be appreciated that the new disease observation data may be entered by another grower associated with the same or different agricultural fields 102, or by another system, database, etc.

With reference again to FIG. 1, as described, the data server 108 is communicatively coupled to the agricultural computer system 116 and is configured to send external data 120 (e.g., data associated with growing spaces, or data as otherwise described herein, etc.) to agricultural computer system 116, via the external data server 122 and the network (s) herein (e.g., for use with the multiple disease joint model (e.g., training, validation, application, etc.), etc.). The data server 108 may be owned or operated by the same legal person or entity as the agricultural computer system 116, or by a different person or entity, such as a government agency, non-governmental organization (NGO), and/or a private data service provider. Examples of external data 120 may include location data, weather data, imagery data, soil data, seed data and treatment data as described herein, data from the various growing spaces herein, or statistical data relating to crop yields, among others (or other data as described herein). External data 120 may include the same type of information as field data. In some embodiments, the external data 120 may also be provided by data server 108 owned by the same entity that owns and/or operates the agricultural computer system 116. For example, the agricultural computer system 116 may include a data server focused exclusively on a type of data that might otherwise be obtained from third party sources, such as weather data to trial data to treatment data. In some embodiments, data server 108 may be incorporated or integrated, in whole or in part, in the agricultural computer system 116.

Also, the farm equipment 106 may have one or more remote sensors fixed thereon (e.g., sensor 107, etc.), where the sensor(s) are communicatively coupled, either directly or indirectly, via the farm equipment 106 to the agricultural computer system 116 and are configured to send sensor data to agricultural computer system 116.

As generally described above, examples of farm equipment 106 that may be included in the system 100 include tractors, combines, pickers, sprayers, planters, trucks, fertilizer equipment, aerial vehicles including unmanned aerial vehicles, and any other item of physical machinery or hardware, typically mobile machinery, and which may be used in tasks associated with agriculture and/or related to operations described herein. In some embodiments, a single unit of the farm equipment 106 may comprise a plurality of sensors that are coupled locally in a network on the apparatus/equipment. A controller area network (CAN) is an example of such a network that can be installed in combines, harvesters, sprayers, and cultivators. In connection therewith, then, an application controller associated with the farm equipment 106 may be communicatively coupled to agricultural computer system 116 via the network(s) and programmed, or configured, to receive one or more scripts (e.g., from the agricultural computer system 116, etc.) that are used to control an operating parameter of the farm equipment 106 (or another agricultural vehicle or implement). For instance, a CAN bus interface may be used to enable communications from the agricultural computer system 116 to the farm equipment 106 (e.g., to a computing device 109 of the farm equipment 106, etc.), for example, such as through the CLIMATE FIELDVIEW DRIVE, available from Climate LLC, Saint Louis, Missouri. Sensor data may include the same type of information as field data. In some embodiments, remote sensors may not be fixed to the farm equipment 106 but may be remotely located in the field and may communicate with one or more networks of the system 100.

As indicated above, the network(s) of the system 100 are generally illustrated in FIG. 1 by arrowed lines. In connection therewith, the network(s) broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. For instance, the farm equipment 106 in the system 100, data server 108, agricultural computer system 116, and other elements of the system 100 may each comprise an interface compatible with the network(s) and programmed, or configured, to use standardized protocols for communication across the networks, such as TCP/IP, Bluetooth, CAN protocol and higher-layer protocols, such as HTTP, TLS, and the like.

That said, the agricultural computer system 116 is configured, generally, to receive field data from farm equipment 106, the communication device 104, the external data 120 from external data server 122, and sensor data from one or more remote sensors in the system 100. Agricultural computer system 116 may be further configured to host, use or execute one or more computer programs, other software elements, digitally programmed logic, such as FPGAs or ASICs, or any combination thereof, to perform translation and storage of data values, construction of digital models of one or more crops on one or more fields, generation of recommendations and notifications, and generation and sending of scripts, in the manner described further in other sections of this disclosure.

In an embodiment, agricultural computer system 116 is programmed with or comprises a communication layer 132, a presentation layer 134, a data management layer 140, a hardware/virtualization layer 150, and a model and field data repository layer 160. "Layer," in this context, refers to any combination of electronic digital interface circuits, microcontrollers, firmware, such as drivers, and/or computer programs, or other software elements.

Communication layer 132 may be configured to perform input/output interfacing functions including sending requests to communication device 104, data server 108, and remote sensor(s) for field data, external data 120, and sensor data respectively. Communication layer 132 may be configured to send the received data to the model and field data repository layer 160 to be stored as field data (e.g., in agricultural computer system 116, etc.). Presentation layer 134 may be configured to generate a graphical user interface (GUI) to be displayed on communication device 104, via one or more applications, (e.g., such as the interfaces illustrated in FIGS. 2A-2D, etc.) (e.g., to interact with the agricultural computer system 116, to identify the target field(s), to select inputs, etc.), or other computers that are coupled to the agricultural computer system 116 through the network(s). The GUI may comprise controls for inputting data to be sent to the agricultural computer system 116, generating requests for models and/or recommendations, and/or displaying recommendations, notifications, models, and other field data.

Data management layer 140 may be configured to manage read operations and write operations involving the reposi-tory layer 160 and other functional elements of the system 100, including queries and result sets communicated between the functional elements of the system and the repository layer 160. Examples of data management layer 140 include JDBC, SQL server interface code, and/or HADOOP interface code, among others. The repository layer 160 may comprise a database. As used herein, the term "database" may refer to either a body of data, a relational database management system (RDBMS), or both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to, ORACLE®, MYSQL, IBM® DB2, MICROSOFT® SQL SERVER, SYBASE®, and POSTGRESQL databases. That said, any database may be used that enables the systems and methods described herein.

When field data is not provided directly to the agricultural computer system 116 via farm equipment (e.g., equipment 106, etc.) that interacts with the agricultural computer sys-tem 116, the user 103 may be prompted via one or more user interfaces on the communication device 104 (served by the agricultural computer system 116) to input such data to the agricultural computer system 116. In an example embodi-ment, the user 103 may specify disease observations by accessing a map on the communication device 104 (served by the agricultural computer system 116) and selecting locations for the disease observation, as explained above, that have been graphically shown on the map. The user 103 may then indicate on the map the specific disease observa-tion.

In an example embodiment, the agricultural computer system 116 is programmed to generate and cause displaying of one or more interfaces comprising a data manager for data input. After one or more fields (or associated data) have been identified using the methods described above, the data manager may provide one or more graphical user interface widgets which when selected can identify changes to the field, soil, crops, tillage, or nutrient practices, and/or which may provide comparison data related to treatments, yields, etc. identified by the disclosure herein for fields of the growing spaces. The data manager may include a timeline view, a spreadsheet view, a graphical view, and/or one or more editable programs.

In an embodiment, the above described trained disease model and data is stored in the model and field data repository layer 160. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values indicative of likelihood of occur-rence of one or more diseases that can serve as the basis of computer-implemented output data displays, or machine control, among other things.

With continued reference to FIG. 1, in an embodiment, instructions 135 of the agricultural computer system 116 may comprise a set of one or more pages of main memory, such as RAM, in the agricultural computer system 116 into which executable instructions have been loaded and which when executed cause the agricultural computer system 116 to perform the functions or operations that are described herein. For example, the instructions 135 may comprise a set of pages in RAM that contain instructions which, when executed, cause determining likelihoods of occurrence of one or more diseases as described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, the instruc-tions 135 also may represent one or more files, or projects of source code, that are digitally stored in a mass storage device, such as non-volatile RAM or disk storage, in the agricultural computer system 116 or a separate repository system, which when compiled or interpreted cause generat-ing executable instructions which when executed cause the agricultural computer system 116 to perform the functions or operations that are described herein.

Hardware/virtualization layer 150 comprises one or more central processing units (CPUs), memory controllers, and other devices, components, or elements of a computer system, such as volatile or non-volatile memory, non-vola-tile storage, such as disk, and I/O devices or interfaces as illustrated and described, for example, in connection with FIGS. 2A-2D. The hardware/virtualization layer 150 also may comprise programmed instructions that are configured to support visualization, virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices associated with different users/growers. Further, the agricul-tural computer system 116 and/or data server 108 may be implemented using two or more processors, cores, clusters, or instances of physical machines or virtual machines, configured in a discrete location or co-located with other elements in a datacenter, shared computing facility or cloud computing facility.

In an embodiment, the implementation of the functions described herein using one or more computer programs, or other software elements that are loaded into and executed using one or more general-purpose computers, will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or direc-tions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowl-edge of such a person given the level of skill that is appropriate for disclosures of this type.

In an embodiment, the user 103 interacts with the agricultural computer system 116 using the communication device 104 configured with an operating system and one or more applications or apps (e.g., application 105, etc.). The communication device 104 also may interoperate with the agricultural computer system 116 independently and automatically under program control or logical control and direct user interaction is not always required. The communication device 104 broadly represents one or more of a smart phone, PDA, tablet computing device, laptop computer, desktop computer, workstation, or any other computing device capable of transmitting and receiving information and performing the functions described herein. The communication device 104 may communicate via a network using a mobile application stored on the communication device 104, and in some embodiments, the communication device 104 may be coupled using a cable or connector to one or more sensors and/or other apparatus in the system 100. The particular user 103 may own, operate or possess and use, in connection with system 100, more than one communication device at a time.

The application associated with the communication device 104 may provide client-side functionality, via the network to one or more mobile computing devices. Again, the communication device 104 may access the application, via a web browser or a local client application or app. The communication device 104 may transmit data to, and receive data from, one or more front-end servers, using web-based protocols, or formats, such as HTTP, XML and/or JSON, or app-specific protocols. In an example embodiment, the data may take the form of requests (e.g., filter criteria, selections, etc.) and user information input, such as data (e.g., disease observation, etc.), into the communication device 104.

A commercial example of the application described above is CLIMATE FIELDVIEW, commercially available from Climate LLC, Saint Louis, Missouri. The CLIMATE FIELDVIEW application and associated tools, or other applications, may be modified, extended, or adapted to include features, functions, and programming that have not been disclosed earlier than the filing date of this disclosure. In one embodiment, the application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIGS. 4A-4B illustrate two views of an example logical organization of sets of instructions in main memory when an example mobile application is loaded for execution. Each named element represents a region of one or more pages of RAM, or other main memory, or one or more blocks of disk storage, or other non-volatile storage, and the programmed instructions within those regions. In one embodiment, in FIG. 4A, a mobile computer application 300 comprises account, fields, data ingestion, sharing instructions 302, overview and alert instructions 304, digital map book instructions 306, seeds and planting instructions 308, treatment decision instructions 310, weather instructions 312, crop disease type instructions 314, and performance instructions 316.

In one embodiment, a mobile computer application 300 comprises account, fields, data ingestion, sharing instructions 302 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 300 comprises a data inbox. In response to receiving a selection of the data inbox, the mobile computer application 300 may display a graphical user interface for manually uploading data files and importing uploaded files to a data manager.

In one embodiment, digital map book instructions 306 comprise field map data layers stored in device memory and are programmed with data visualization tools and geospatial field notes. This provides growers with convenient information close at hand for reference, logging and visual insights into field performance and other options provided herein. In one embodiment, overview and alert instructions 304 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 308 are programmed to provide tools for seed selection, hybrid placement, and script creation, including variable rate (VR) script creation, based upon scientific models and empirical data. This enables growers to maximize yield, or return on investment, through optimized seed purchase, placement and population.

In one embodiment, script generation instructions 305 are programmed to provide an interface for generating scripts, including variable rate (VR) fertility scripts, disease treatment scripts, etc. The interface enables growers to create scripts for field implements, such as treatment decisions, planting, and irrigation. For example, a planting script interface may comprise tools for identifying a type of seed for planting. Upon receiving a selection of the seed type, mobile computer application 300 may display one or more fields broken into management zones, such as the field map data layers created as part of digital map book instructions 306. In one embodiment, the management zones comprise soil zones along with a panel identifying each soil zone and a soil name, texture, drainage for each zone, or other field data. Mobile computer application 300 may also display tools for editing or creating such as graphical tools for drawing management zones, such as soil zones, over a map of one or more fields. Planting procedures may be applied to all management zones or different planting procedures may be applied to different subsets of management zones. When a script is created, mobile computer application 300 may make the script available for download in a format readable by an application controller, such as an archived or compressed format. Additionally, and/or alternatively, a script may be sent directly to a cab computer (e.g., associated with farm equipment 106, etc.) from mobile computer application 300 and/or uploaded to one or more data servers and stored for further use.

In one embodiment, treatment decision instructions 310 are programmed to provide tools to inform decisions by visualizing or instruction about the application of one or more candidate treatments to crops in a particular field. This enables growers to potentially enhance yield or return on investment through treatment application during the season.

Example programmed functions include displaying images to enable tuning application(s) of treatment across multiple zones; output of scripts to drive machinery; tools for mass data entry and adjustment; and/or maps for data visualization, among others. Treatment decision instructions 310 also may be programmed to generate and cause displaying a treatment graph, indicative of the application of the treatment to one or more target fields, but not others based on the functions explained herein. In one embodiment, the treatment graph may include one or more user input features, such as dials or slider bars, to dynamically change the candidate treatment programs so that the grower may alter the parameters of the treatment decision. Treatment instructions 310 also may be programmed to generate and cause displaying a treatment decision or indications.

In one embodiment, weather instructions 312 are programmed to provide field-specific recent weather data and forecasted weather information. This enables growers to save time and have an efficient integrated display with respect to daily operational decisions.

In one embodiment, crop disease type instructions 314 are programmed to provide timely remote sensing images highlighting in-season crop variation, multiple crop disease types and potential concerns. Example programmed functions include cloud checking, to identify possible clouds or cloud shadows; determining treatment indices based on field images; graphical visualization of scouting layers, including, for example, those related to field health, and viewing and/or sharing of scouting notes; recording observations of different crop disease type presence and/or severity; and/or downloading satellite images from multiple sources and prioritizing the images for the grower, among others.

In one embodiment, performance instructions 316 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 316 may be programmed to communicate via the network(s) to back-end analytics programs executed at agricultural computer system 116 and/or data server 108 and configured to analyze metrics, such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application 300 as configured for tablet computers, or smartphones, may provide a full app experience, or a cab app experience, that is suitable for the display and processing capabilities of a cab computer (e.g., associated with farm equipment 10, etc.). For example, referring now to FIG. 4B, in one embodiment a cab computer application 320 (e.g., as accessible in one of farm equipment 106, etc.) may comprise maps-cab instructions 322, remote view instructions 324, data collect and transfer instructions 326, machine alerts instructions 328, script transfer instructions 330, and scouting-cab instructions 332. The code base for the instructions of FIG. 4B may be the same as for FIG. 4A and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 322 may be programmed to provide map views of fields, farms or regions that are useful in directing machine operation. The remote view instructions 324 may be programmed to turn on, manage, and provide views of machine activity in real-time or near real-time to other computing devices connected to the agricultural computer system 116 via wireless networks, wired connectors or adapters, and the like. The data collect and transfer instructions 326 may be programmed to turn on, manage, and provide transfer of data collected at sensors and controllers to the agricultural computer system 116 via wireless networks, wired connectors or adapters, and the like (e.g., via network(s) in the system 100, etc.). The machine alerts instructions 328 may be programmed to detect issues with operations of the machines or tools that are associated with the cab and generate operator alerts. The script transfer instructions 330 may be configured to transfer in scripts of instructions that are configured to direct machine operations or the collection of data. The scouting-cab instructions 332 may be programmed to display location-based alerts and information received from the agricultural computer system 116 based on the location of the communication device 104, farm equipment 106, or sensors in the field (of the growing spaces) and ingest, manage, and provide transfer of location-based scouting observations to the agricultural computer system 116 based on the location of the farm equipment 106, or sensors in the field.

In an embodiment, data server 108 stores external data 120 from the data server 122, including soil data representing soil composition for the one or more fields and weather data representing temperature and precipitation on the one or more fields (and/or other data). The weather data may include past and present weather data as well as forecasts for future weather data. In an embodiment, data server 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil. Further, in some embodiments, the data server 108, again, may include data associated with the growing spaces with regard to available seeds for use in comparisons, etc.

In an embodiment, remote sensors in the system 100 may comprise one or more sensors that are programmed, or configured, to produce one or more observations related to growing spaces, trials therein, etc. Remote sensors may be aerial sensors, such as satellites, vehicle sensors, planting equipment sensors, tillage sensors, fertilizer or insecticide application sensors, harvester sensors, and any other implement capable of receiving data from the one or more fields (e.g., associated with one or more of the growing spaces, etc.). In an embodiment, farm equipment 106 may include an application controller programmed, or configured, to receive instructions from agricultural computer system 116. The application controller may also be programmed, or configured, to control an operating parameter of the farm equipment 106. Other embodiments may use any combination of sensors and controllers, of which the following are merely selected examples.

The system 100 may obtain or ingest data under grower control, on a mass basis from a large number of growers who have contributed trial data or other data to a shared database system. This form of obtaining data may be termed "manual data ingest" as one or more user-controlled computer operations are requested, or triggered, to obtain data for use by the agricultural computer system 116. As an example, the CLIMATE FIELDVIEW application, commercially available from Climate LLC, Saint Louis, Missouri, may be operated to export data to agricultural computer system 116 for storing in the field data repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed, or configured, to display seed spacing, population and other information to the user via a cab computer of the apparatus, or other devices within the system 100.

Likewise, yield monitor systems may contain yield sensors for harvester apparatus that send yield measurement data to a cab computer of the apparatus, or other devices within the system 100. Yield monitor systems may utilize one or more remote sensors to obtain grain moisture measurements in a combine, or other harvester, and transmit these measurements to the user 103 via the cab computer, or other devices within the system 100.

In an embodiment, examples of sensors that may be used with any moving vehicle, or apparatus of the type described elsewhere herein, include kinematic sensors and position sensors. Kinematic sensors may comprise any of speed sensors, such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors that may be used with tractors, or other moving vehicles, include engine speed sensors, fuel consumption sensors, area counters or distance counters that interact with GPS or radar signals, PTO (power take-off) speed sensors, tractor hydraulics sensors configured to detect hydraulics parameters, such as pressure or flow, and/or and hydraulic pump speed, wheel speed sensors or wheel slippage sensors. In an embodiment, examples of controllers that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors that may be used with seed planting equipment, such as planters, drills, or air seeders, include seed sensors, which may be optical, electromagnetic, or impact sensors; downforce sensors, such as load pins, load cells, pressure sensors; soil property sensors, such as reflectivity sensors, moisture sensors, electrical conductivity sensors, optical residue sensors, or temperature sensors; component operating criteria sensors, such as planting depth sensors, downforce cylinder pressure sensors, seed disc speed sensors, seed drive motor encoders, seed conveyor system speed sensors, or vacuum level sensors; or pesticide application sensors, such as optical or other electromagnetic sensors, or impact sensors. In an embodiment, examples of controllers that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors that may be used with tillage equipment include position sensors for tools, such as shanks or discs; tool position sensors for such tools that are configured to detect depth, gang angle, or lateral spacing; downforce sensors; or draft force sensors. In an embodiment, examples of controllers that may be used with tillage equipment include downforce controllers or tool position controllers, such as controllers configured to control tool depth, gang angle, or lateral spacing.

In an embodiment, examples of sensors that may be used in relation to an apparatus for applying fertilizer, insecticide, fungicide, herbicide, and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors, such as accelerometers disposed on sprayer booms. In an embodiment, examples of controllers that may be used with such apparatus include pump speed controllers; valve controllers that are programmed to control pressure, flow, direction, PWM and the like; or position actuators, such as for boom height, subsoiler depth, or boom position.

In an embodiment, examples of sensors that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors, such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers that may be used with harvesters include header operating criteria controllers for elements, such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors that may be used with grain carts include weight sensors, or sensors for auger position, operation, or speed. In an embodiment, examples of controllers that may be used with grain carts include controllers for auger position, operation, or speed.

In an embodiment, examples of sensors and controllers may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors.

In an embodiment, sensors and controllers may be affixed to a soil sampling and measurement apparatus that is configured, or programmed, to sample soil and perform soil chemistry tests, soil moisture tests, and other tests pertaining to soil.

In an embodiment, sensors and controllers may comprise weather devices for monitoring weather conditions of fields.

In an embodiment, the agricultural computer system 116 is programmed, or configured, to create an agronomic model. In this context, an agronomic model is a data structure in memory of the agricultural computer system 116 that comprises field data, such as identification data and harvest data for one or more fields. The agronomic model may also comprise calculated agronomic properties which describes either conditions which may affect the growth of one or more crops on a field, or properties of the one or more crops, or both. Additionally, an agronomic model may comprise recommendations based on agronomic factors, such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples, the revenue or profit obtained from the produced crop.

In an embodiment, the agricultural computer system 116 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location, or a comparison of treatment recommendations to validation data.

According to one example embodiment, the techniques described herein are implemented by one or more special-purpose computing devices. The special-purpose computing devices may be hard-wired to perform the techniques, or may include digital electronic devices, such as one or more application-specific integrated circuits (ASICs) or field programmable gate arrays (FPGAs), that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be a desktop computer systems, portable computer systems, handheld devices, networking devices or any other device that incorporates hard-wired and/or program logic to implement the techniques.

For example, FIG. 5 is a block diagram that illustrates a computer system 500 upon which embodiments of the present disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508, or other static storage device coupled to bus 502, for storing static information and instructions for processor 504. A storage device 510, such as a magnetic disk, optical disk, or solid-state drive, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes; a first axis (e.g., x, etc.) and a second axis (e.g., y, etc.), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of, or in combination with, software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but may be used in conjunction with, transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infrared data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

With that said, it should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a user input from a user at a communication device associated with an interface indicative of likelihood of a first disease in a plurality of agricultural fields; (b) accessing data associated with the agricultural fields and a disease model, the data associated with the agricultural fields including disease observation data indicative of an observation of the first disease in a first field of the agricultural fields, the disease observation data including a temporal indicator, an identifier of the first disease, and an identifier of the first field; (c) determining the likelihood of occurrence of the first disease for ones of the plurality of agricultural fields, based on: (i) a model value based on the disease model; and (ii) a tuning value, using a spatially misaligned regression; wherein the tuning value is based on at least: a distance between a location of the first field and locations of the ones of the plurality of agricultural fields; (d) generating an interface indicative of the likelihood of occurrence of the first disease in the ones of the plurality of agricultural fields; (e) causing the interface to be displayed at the communication device associated with the user; and/or (f) treating the agricultural field with a treatment in response to the interface indicating a chance of occurrence of the first disease above a defined threshold.

Examples and embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more example embodiments disclosed herein may provide all or none of the above mentioned advantages and improvements and still fall within the scope of the present disclosure.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "in communication with," or "included with" another element or layer, it may be directly on, engaged, connected or coupled to, or associated or in communication or included with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for directing crop disease treatments to a plurality of agricultural fields, the computer-implemented method comprising:

receiving, by a computing device, a user input from a user at a communication device associated with an interface indicative of likelihood of a first disease in a plurality of agricultural fields;

accessing, by the computing device, data associated with the agricultural fields and a disease model, the data associated with the agricultural fields including disease observation data indicative of an observation of the first disease in a first field of the agricultural fields, the disease observation data including a temporal indicator, an identifier of the first disease, and an identifier of the first field;

determining, by the computing device, the likelihood of occurrence of the first disease for at least one other field of the plurality of agricultural fields, based on: (i) a model value based on the disease model; and (ii) a tuning value, using a spatially misaligned regression; wherein the tuning value is based on at least: a distance between a location of the first field and a location of the at least one other field of the plurality of agricultural fields;

generating, by the computing device, an interface indicative of the likelihood of occurrence of the first disease in the at least one other field of the plurality of agricultural fields; and causing the interface to be displayed at the communication device associated with the user.

2. The computer-implemented method of claim 1, wherein the user input includes a request for the interface indicative of likelihood of a first disease.

3. The computer-implemented method of claim 1, wherein the user input includes the disease observation data indicative of the observation of the first disease in the first field.

4. The computer-implemented method of claim 3, wherein the user input is based on a pin drop in a map interface, at the communication device.

5. The computer-implemented method of claim 4, wherein the interface indicative of the likelihood of the first disease in the plurality of fields includes the map interface.

6. The computer-implemented method of claim 1, wherein determining the likelihood of occurrence of the first disease for at least one other field of the plurality of agricultural fields is further based on a difference in time between the temporal indicator of the disease observation data and a current time.

7. The computer-implemented method of claim 1, wherein determining the likelihood of occurrence of the first disease for at least one other field of the plurality of agricultural fields is based on:

$$logit[P(Y_i = 1)] = \Sigma_{i,Z}^T \Sigma_Z^{-1} Z + w_i$$

where Y is the regular training data; Tis an operator for transpose; Z is a vector of data indicative of the disease observation data; $w_i$ is the likelihood of occurrence of the first disease the ith agricultural field of the plurality of agricultural fields; and Σ is a cross-covariance matrix between Y and Z.

8. The computer-implemented method of claim 7, wherein the cross-covariance matrix is expressed as:

$$\Sigma_{i,j} = Cov(logit(Y)_{i,s,t}, Z_{i',s',t'}) = B[d, d']exp(-\|s - s'\|/\phi_1)exp(-|t - t'|/\phi_2)$$

where d-d' is the difference in disease multiplied by a disease effect matrix B; s-s' is a distance between agricultural field i and the first agricultural field; and t-t' is the time between the observation in agricultural field i and the first agricultural field.

9. The computer-implemented method of claim 1, wherein the interface includes a map of the plurality of agricultural fields, in which each of the plurality of agricultural fields includes a visual feature indicative of the respective updated likelihood of occurrence of the first disease; and/or wherein the visual feature includes coloring.

10. The computer-implemented method of claim 1, further comprising treating the at least one other field of the plurality of agricultural fields with a treatment in response to the interface indicating a chance of occurrence of the first disease above a defined threshold.

11. A system for directing crop disease treatments to a plurality of agricultural fields, the system comprising at least one computing device configured to:

receive a user input from a user at a communication device associated with an interface indicative of likelihood of a first disease in a plurality of agricultural fields;

access data associated with the agricultural fields and a disease model, the data associated with the agricultural fields including disease observation data indicative of an observation of the first disease in a first field of the agricultural fields, the disease observation data including a temporal indicator, an identifier of the first disease, and an identifier of the first field;

determine the likelihood of occurrence of the first disease for at least one other field of the plurality of agricultural fields, based on: (i) a model value based on the disease model; and (ii) a tuning value, using a spatially misaligned regression; wherein the tuning value is based on at least: a distance between a location of the first field and a location of the at least one other field of the plurality of agricultural fields;

generate an interface indicative of the likelihood of occurrence of the first disease in the at least one other field of the plurality of agricultural fields; and cause the interface to be displayed at the communication device associated with the user.

12. The system of claim 11, further comprising a non-transitory computer-readable storage medium comprising executable instructions, which when executed by the communication device associated with the user, cause the communication device to display the interface at a display device of the communication device.

13. The system of claim 11, further comprising farm equipment configured to apply a treatment to the at least one other field of the plurality of agricultural fields in response to the interface indicating a chance of occurrence of the first disease above a defined threshold.

14. The system of claim 13, wherein the at least one computing device is further configured to generate one or more instructions relating to application of the treatment to the at least one other field of the plurality of agricultural fields, and transmit the one or more instructions to the farm equipment to thereby cause the farm equipment to apply the treatment to the at least one other field of the plurality of agricultural fields.

15. The system of claim 11, wherein the interface indicative of the likelihood of the first disease in the plurality of fields includes the map interface.

16. The system of claim 11, wherein the at least one computing device is configured to determine the likelihood of occurrence of the first disease for at least one other field of the plurality of agricultural fields, further based on a difference in time between the temporal indicator of the disease observation data and a current time.

17. The system of claim 11, wherein the interface includes a map of the plurality of agricultural fields, in which each of the plurality of agricultural fields includes a visual feature indicative of the respective updated likelihood of occurrence of the first disease; and/or wherein the visual feature includes coloring.

18. A non-transitory computer-readable storage medium including executable instructions, which when executed by at least one processor, cause the at least one processer to:

receive a user input from a user at a communication device associated with an interface indicative of likelihood of a first disease in a plurality of agricultural fields;

access data associated with the agricultural fields and a disease model, the data associated with the agricultural fields including disease observation data indicative of an observation of the first disease in a first field of the agricultural fields, the disease observation data including a temporal indicator, an identifier of the first disease, and an identifier of the first field;

determine the likelihood of occurrence of the first disease for at least one other field of the plurality of agricultural fields, based on: (i) a model value based on the disease model; and (ii) a tuning value, using a spatially misaligned regression; wherein the tuning value is based on at least: a distance between a location of the first field and a location of the at least one other field of the plurality of agricultural fields;

generate an interface indicative of the likelihood of occurrence of the first disease in the at least one other field of the plurality of agricultural fields; and cause the interface to be displayed at the communication device associated with the user.

19. The non-transitory computer-readable storage medium of claim 18, wherein the interface includes a map of the plurality of agricultural fields, in which each of the plurality of agricultural fields includes a visual feature indicative of the respective updated likelihood of occurrence of the first disease; and/or wherein the visual feature includes coloring.

20. The non-transitory computer-readable storage medium of claim 18, wherein the executable instructions, when executed by the at least one processor, cause the at least one processor to determine the likelihood of occurrence of the first disease for at least one other field of the plurality of agricultural fields, further based on a difference in time between the temporal indicator of the disease observation data and a current time.

\*  \*  \*  \*  \*